United States Patent
Moon et al.

(10) Patent No.: US 9,787,387 B2
(45) Date of Patent: Oct. 10, 2017

(54) METHOD AND APPARATUS FOR VIRTUALIZING ANTENNA IN MULTI-ANTENNA SYSTEM, AND METHOD AND APPARATUS FOR TRANSMITTING AND RECEIVING SIGNAL USING THE SAME

(71) Applicant: Electronics and Telecommunications Research Institute, Daejeon (KR)

(72) Inventors: Sung-Hyun Moon, Daejeon (KR); Cheulsoon Kim, Daejeon (KR); Gi Yoon Park, Daejeon (KR); Wooram Shin, Daejeon (KR); Young Jo Ko, Daejeon (KR); Junyoung Nam, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/153,887

(22) Filed: May 13, 2016

(65) Prior Publication Data
US 2016/0337017 A1    Nov. 17, 2016

(30) Foreign Application Priority Data

May 15, 2015  (KR) .................. 10-2015-0067856
May 27, 2015  (KR) .................. 10-2015-0073625
Apr. 1, 2016   (KR) .................. 10-2016-0040378

(51) Int. Cl.
H04L 27/00    (2006.01)
H04B 7/06     (2006.01)
H04B 7/10     (2017.01)

(52) U.S. Cl.
CPC ......... *H04B 7/0691* (2013.01); *H04B 7/0617* (2013.01); *H04B 7/10* (2013.01)

(58) Field of Classification Search
CPC ....... H04L 1/0618; H04L 1/06; H04L 1/0071; H04L 25/0204; H04L 27/368; H04L 25/03343; H04L 1/0003; H04L 5/0007; H04L 1/0009; H04L 27/0008;
(Continued)

(56) References Cited

U.S. PATENT DOCUMENTS 7,848,218 B2   12/2010  Lee et al.
2011/0274205 A1 11/2011  Lee et al.
2014/0204853 A1 7/2014  Ko et al.
(Continued)

FOREIGN PATENT DOCUMENTS

WO    2010087639 A2    8/2010

OTHER PUBLICATIONS

"Effect of virtualization schemes on CSI-RS coverage," 3GPP TSG RAN WG1 Meeting #81, R1-153004, May 25-29, 2015, pp. 1-5.
(Continued)

*Primary Examiner* — Zewdu Kassa
(74) *Attorney, Agent, or Firm* — William Park & Associates Ltd.

(57) ABSTRACT

The transmitter maps an antenna port to a logical antenna port through a first virtualization. The transmitter maps the logical antenna port to a transceiver unit (TXRU) through a first operation. The transmitter maps the TXRU to a logical TXRU through a second operation. The transmitter maps the logical TXRU to a physical antenna element through a second virtualization.

20 Claims, 11 Drawing Sheets

(58) Field of Classification Search
CPC ... H04B 7/0669; H03F 1/3247; H03F 1/3294; H03F 2201/3233
USPC .................. 375/299, 296, 295, 219, 316
See application file for complete search history.

(56) References Cited

U.S. PATENT DOCUMENTS

2015/0124688 A1* 5/2015 Xu ................... H04B 7/0452
                                                   370/312
2015/0312919 A1* 10/2015 Lee .................. H04B 7/0473
                                                   370/252

OTHER PUBLICATIONS

"Effect of antenna virtualization on CSI-RS coverage in EBF/FD-MIMO," 3GPP TSG RAN WG1 Meeting #82, R1-154395, Aug. 24-28, 2015, pp. 1-4.

"3rd Generation Partnership Project; Technical Specification Group Radio Access Network; Evolved Universal Terrestrial Radio Access (E-UTRA); Physical channels and modulation (Release 12)," 3GPP TS 36.211, Jun. 2015, pp. 1-136, V12.6.0, 3GPP Organizational Partners.

"3rd Generation Partnership Project; Technical Specification Group Radio Access Network; Evolved Universal Terrestrial Radio Access (E-UTRA); Multiplexing and channel coding (Release 12)," 3GPP TS 36.212, Jun. 2015, pp. 1-94, V12.5.0, 3GPP Organizational Partners.

"3rd Generation Partnership Project; Technical Specification Group Radio Access Network; Evolved Universal Terrestrial Radio Access (E-UTRA); Physical layer procedures (Release 12)," 3GPP TS 36.213, Jun. 2015, pp. 1-241, V12.6.0, 3GPP Organizational Partners.

"3rd Generation Partnership Project; Technical Specification Group Radio Access Network; Evolved Universal Terrestrial Radio Access (E-UTRA); Physical layer; Measurements (Release 12)," 3GPP TS 36.214, Mar. 2015, pp. 1-17, V12.2.0, 3GPP Organizational Partners.

* cited by examiner

METHOD AND APPARATUS FOR VIRTUALIZING ANTENNA IN MULTI-ANTENNA SYSTEM, AND METHOD AND APPARATUS FOR TRANSMITTING AND RECEIVING SIGNAL USING THE SAME

CROSS-REFERENCE TO RELATED APPLICATION

This application claims priority to and the benefit of Korean Patent Application Nos. 10-2015-0067856, 10-2015-0073625, and 10-2016-0040378 filed in the Korean Intellectual Property Office on May 15, 2015, May 27, 2015, and Apr. 1, 2016, the entire contents of which are incorporated herein by reference.

BACKGROUND OF THE INVENTION (a) Field of the Invention

The present invention relates to a method and an apparatus for virtualizing an antenna in a multi-antenna system, and a method and apparatus for transmitting/receiving a signal using the same.

(b) Description of the Related Art

A multiple-input multiple-output (MIMO) method is a method of transmitting and receiving a signal by using a plurality of transmission antennas and a plurality of reception antennas. In the MIMO system, a plurality of radio channel paths are generated between the transmission/reception antennas, and data transmission capacity is increased and performance may be improved by separating or merging them to transmission/reception end. The MIMO technique includes a spatial multiplexing method and a spatial diversity technique.

Also, the MIMO technique may be classified into a closed-loop technique and an open-loop technique depending on channel state information (CSI) feedback existence. The closed-loop technique is a technique in which pre-coding in a transmission end depends on the CSI feedback of the terminal, and the open-loop technique is a technique in which pre-coding in the transmission end does not depend on the CSI feedback of the terminal.

Various downlink and uplink MIMO techniques have been introduced in the LTE (long term evolution) system. The downlink MIMO technique supports transmit diversity, cyclic delay diversity (CDD), closed-loop beamforming, and spatial multiplexing methods. Also, the downlink MIMO technique supports a multi-user MIMO (MU-MIMO) technique of simultaneously transmitting data to a plurality of terminals in the same resource. Four transmission antennas are defined as a maximum in LTE Release 8, and eight transmission antennas are defined as a maximum in LTE Release 10.

In the LTE standard, an antenna port (AP) as a logical antenna unit is realized by a weighted sum of one or a plurality of physical antenna elements and is mainly defined in the transmission end. The antenna port is also a basic unit in which an LTE reference signal(s) (RS) is transmitted. Accordingly, the terminal estimates a channel for each antenna port that is not the physical antenna element and performs CSI measuring and reporting based on the channel. Different antenna port numbers are respectively given to a cell-specific RS (CRS), a user equipment-specific RS (URS), and a CSI-RS that are LTE downlink reference signals. For example, the antenna port number for the CRS may be #0 to #3, the antenna port number for the URS may be #7 to #14, and the antenna port number for the CSI-RS may be #15 to #22. Mapping between the antenna port and the physical antenna element(s) is referred to as antenna virtualization. Basically, the terminal cannot know whether any virtualization is applied to each antenna port.

On the other hand, when the base station configures CSI-RS antenna ports of a large number to the terminal, a method for ensuring maximum transmission power for each CSI-RS antenna port is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a method and an apparatus for ensuring maximum transmission power of each CSI-RS antenna port.

According to an exemplary embodiment of the present invention, a signal transmission method of a transmitter is provided. A signal transmission method of a transmitter includes: mapping an antenna port to a logical antenna port through a first virtualization; mapping the logical antenna port to a transceiver unit (TXRU) through a first operation; mapping the TXRU to a logical TXRU through a second operation; and mapping the logical TXRU to a physical antenna element through a second virtualization.

A first complex matrix corresponding to the first operation may be a unitary matrix of which a size of each element is 1, and may be an inverse matrix of a second complex matrix corresponding to the second operation.

The logical antenna port may be a physical path for a result of the first virtualization to be an input for the first operation.

The logical TXRU having the same number as the number of logical antenna ports may be a physical path for a result of the second operation to be an input for the second virtualization.

The first complex matrix may be generated based on one of a discrete Fourier transform (DFT) matrix and an inverse discrete Fourier transform (IDFT) matrix.

The second complex matrix is generated based on the other of the DFT matrix and the IDFT matrix.

The first complex matrix may be generated based on one of a Hadamard matrix and an inverse matrix of the Hadamard matrix.

The second complex matrix may be generated based on the other of the Hadamard matrix and the inverse matrix of the Hadamard matrix.

The first complex matrix may have rows of the same number as the number of TXRUs and columns of the same number as the number of logical antenna ports.

The second complex matrix may have rows of the same number as the number of logical TXRUs and columns of the same number as the number of TXRUs.

The first virtualization may correspond to a complex matrix having rows of the same number as the number of logical antenna ports and columns of the same number as the number of antenna ports.

The second virtualization may correspond to a complex matrix having rows of the same number as the number of physical antenna elements and columns of the same number as the number of logical TXRUs.

The antenna port may include a first antenna port for a first signal and a second antenna port for a second signal.

The mapping of the antenna port to the logical antenna port may include making the first antenna port and the second antenna port share the logical antenna port through the first virtualization.

The process for making the first antenna port and the second antenna port share the logical antenna port may include one-to-one mapping the first antenna port to the logical antenna port through the first virtualization, and one-to-many mapping the second antenna port to the logical antenna port through the first virtualization.

The mapping of the antenna port to the logical antenna port may include mapping the first antenna port to a first logical antenna port among the logical antenna ports through the first virtualization, and mapping the second antenna port to a second logical antenna port that is different from the first logical antenna port among the logical antenna ports through the first virtualization.

Further, an antenna virtualization apparatus according to another exemplary embodiment of the present invention is provided. The antenna virtualization apparatus includes: a first complex linear input/output conversion device mapping an antenna port to a logical antenna port through a first virtualization; a second complex linear input/output conversion device mapping the logical antenna port to a transceiver unit (TXRU) through a first operation; a third complex linear input/output conversion device mapping the TXRU to a logical TXRU through a second operation; and a fourth complex linear input/output conversion device mapping the logical TXRU to a physical antenna element through a second virtualization, wherein a first complex matrix corresponding to the first operation is a unitary matrix of which a size of each element is 1 and is an inverse matrix of a second complex matrix corresponding to the second operation.

Also, a signal transmission method of a transmitter according to another exemplary embodiment of the present invention is provided. The signal transmission method of the transmitter includes: grouping a plurality of antenna ports into a plurality of port groups; mapping an antenna port of at least one first port group among the plurality of port groups to a logical antenna port through a first virtualization; mapping the logical antenna port to a transceiver unit (TXRU) through a first operation; mapping the TXRU to a logical TXRU through a second operation; and mapping the logical TXRU to a physical antenna element through a second virtualization.

The grouping may include including an antenna port, belonging to a first row and having first polarization among the plurality of antenna ports arrayed multi-dimensionally, in the at least one first port group.

The grouping may include including an antenna port belonging to a first row among the plurality of antenna ports arrayed multi-dimensionally in the at least one first port group.

DETAILED DESCRIPTION OF THE EMBODIMENTS

Figure 1:
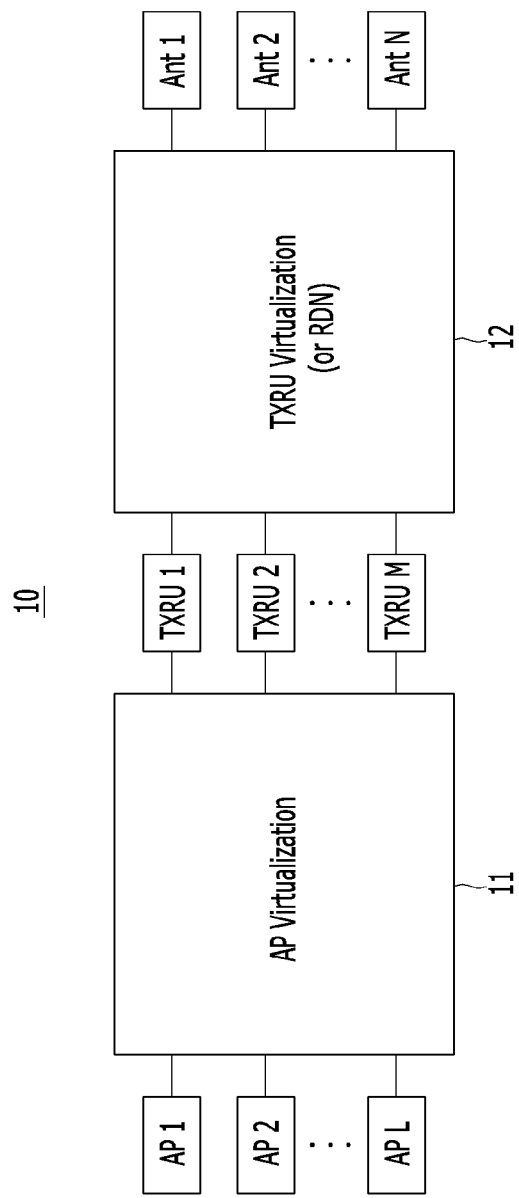
FIG. 1 is a view showing a physical architecture and a device for antenna virtualization.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, a terminal may indicate a mobile terminal, a mobile station, an advanced mobile station, a high reliability mobile station, a subscriber station, a portable subscriber station, an access terminal, user equipment, etc., or may include whole or partial functions of the terminal, the mobile terminal, the mobile station, the advanced mobile station, the high reliability mobile station, the subscriber station, the portable subscriber station, the access terminal, the user equipment, etc.

Also, a base station (BS) may indicate an advanced base station, a high reliability base station, a node B, an evolved node B (eNodeB), an access point, a radio access station, a base transceiver station, an MMR (mobile multihop relay)-BS, a relay station executing a base station function, a high reliability relay station executing the base station function, a repeater, a macro base station, a small base station, etc., or may include whole or partial functions of the base station, the advanced base station, the HR-BS, the nodeB, the eNodeB, the access point, the radio access station, the transceiver base station, the MMR-BS, the relay station, the high reliability relay station, the repeater, the micro base station, the small base station, etc.

In the specification, 'A or B' may include 'A', 'B', or ' both A and B'.

FIG. 1 is a view showing a physical architecture and an apparatus for antenna virtualization. In detail, FIG. 1 shows an effective physical architecture (an effective architecture over a physical domain).

In a communication system based on a digital signal processing, an antenna virtualization apparatus 10 generally includes an antenna port virtualization (AP virtualization) unit 11 and a transceiver unit (TXRU) virtualization unit 12.

Antenna port virtualization by the antenna port virtualization unit 11 means mapping of a linear combination or a weighted sum between the antenna ports AP1, AP2, ..., APL and the TXRUs TXRU1, TXRU2, ..., TXRUM. The antenna port virtualization unit 11 corresponds to a digital unit.

In contrast, TXRU virtualization by the TXRU virtualization unit 12 means mapping of the linear combination or the weighted sum between the TXRUs TXRU1-TXRUM and the physical antenna elements Ant1, Ant2, ..., AntN. The TXRU virtualization unit 12 corresponds to an analog unit.

The TXRU virtualization of the TXRU virtualization unit 12 may be referred to as a radio distribution network (RDN). Here, the TXRU means a unit of a radio frequency (RF) device capable of independently controlling and outputting a phase and an amplitude of the input signal, and for convenience, may indicate an RF chain without distinction of the transmission/reception end. If it is assumed that the entire transmission power of the base station is 1 for convenience, a maximum output power of a power amplifier included in each TXRU may be realized by 1/M.

FIG. 1 shows L antenna ports AP1-APL, M TXRUs TXRU1-TXRUM, and N physical antenna elements Ant1-AntN. Generally, L is equal to or less than M, and M is equal to or less than N (i.e., L≤M≤N). In the drawings of the present specification, 'AP' is an abbreviation for antenna port, and 'Ant' is an abbreviation for antenna and means the physical antenna element.

In the LTE system after Release 10, the CRS may have a maximum of four antenna ports, and the CSI-RS may have a maximum of eight antenna ports. If the virtualization architecture of FIG. 1 is applied for each reference signal, the maximum value of L is 4 in the case of the CRS and the maximum value of L is 8 in the case of the CSI-RS. Since a conventional LTE system only considers a 1-dimentional antenna port array, in this case, M as the number of TXRUs may be realized to be the same as the maximum value of L that is actually used. If each antenna port obtains the antenna array gain, N that is the number of the physical antennas may be larger than M.

In the TXRU virtualization method, there are a sub-array partition method in which the TXRUs TXRU1-TXRUM are connected to different physical antenna elements Ant1-AntN, and a full connection method in which the TXRUs TXRU1-TXRUM are connected to all N physical antenna elements Ant1-AntN thereby allowing a plurality of TXRUs to be connected to the same physical antenna elements. A method in which the number of TXRUs TXRU1-TXRUM is the same as the number of physical antenna elements Ant1-AntN and the TXRUs TXRU1-TXRUM and the physical antenna elements Ant1-AntN are mapped one-to-one may be classified as a sub-array partition method. The sub-array partition method and the full connection method may be equally applied to the antenna port virtualization.

The CSI-RS of the current LTE system is designed under an assumption that the antenna port virtualization uses the one-to-one mapping. That is, it is assumed that the i-th CSI-RS antenna port is connected to the i-th TXRU by a weight value product of an amplitude 1. Accordingly, when it is assumed the transmission power for each TXRU is 1/M, if time division multiplexing (TDM) is applied between the CSI-RS antenna ports, each CSI-RS antenna port may be able to use only 1/M (i.e., the power corresponding to 1/M of a CSI-RS energy per resource element (EPRE)) of the entire transmission power.

To overcome this, in the LTE system, a frequency division multiplexing (FDM) method and a code division multiplexing (CDM) method are applied as a multiplexing method between the CSI-RS antenna ports. By the help of the CSI-RS pattern based on the FDM and the CDM, each CSI-RS antenna port may allocate the entire CSI-RS EPRE.

While the CSI-RS pattern based on the FDM and the CDM allows the full power transmission, the FDM and the CDM respectively have a drawback. The FDM method has a drawback of boosting the power of the CSI-RS RE (resource element), and the CDM method loses orthogonally between the OCCs when the channels between the REs applied with an orthogonal cover code (OCC) are not the same, thereby generating interference. Currently, the LTE standard adopts a method of multiplexing the antenna port within each group of four antenna ports through the FDM method and a method of multiplexing the antenna port within each group of two antenna ports through the CDM method as pattern of the eight CSI-RS antenna ports. Accordingly, a Walsh code having a length of 2 may be applied and the CSI-RS power boost compared with the URS (UE-specific RS) or a physical downlink shared channel (PDSCH) may be generated up to a 6 dB.

On the other hand, in the FD (full-dimension)-MIMO system, to maximize use of a space channel formed through a 2-dimensional active antenna array, TXRUs of a number of more than conventional may be used. For example, in an ongoing 3rd generation partnership project (3GPP) Release 13 standardization, 16, 32, or 64 TXRUs are considered. As described above, as the number of TXRUs is increased, the number of CSI-RS antenna ports that may be configured to the terminal is increased. When the base station wants to configure more than 8 CSI-RS antenna ports to the terminal, a method to ensure maximum transmission power for each CSI-RS antenna port may be divided into a method M10 and a method M20.

The method M10 is a method of additionally applying the FDM method or CDM method between the CSI-RS antenna ports. According to the method M10, as the number of CSI-RS antenna ports is increased, the drawback of the above-described FDM or CDM may be further highlighted. For example, when the conventional eight CSI-RS patterns extend by two times through the FDM method and the 16 CSI-RS patterns are defined, the CSI-RS power boost may be increased by up to a 9 dB. Also, in the case of the FDM, because the number of REs capable of extending in a frequency axis in one resource block (RB) pair is restricted, the patterns for up to only 16 antenna ports may be defined in one RB pair. When the patterns extend through the CDM method, the CSI-RS power boost is not issued, however a channel estimation performance degradation by a time or frequency axis channel change may be generated as the OCC length is increased.

The method M20 is a method by the antenna virtualization. The method M20 is a method of efficiently designing and realizing the mapping of the antenna port virtualization and the mapping of the TXRU virtualization. In the method M20, the FDM, the TDM, or the CDM may be used as the multiplexing method between the CSI-RS antenna ports. Hereafter, the method M20 will be described in detail.

Figure 2:
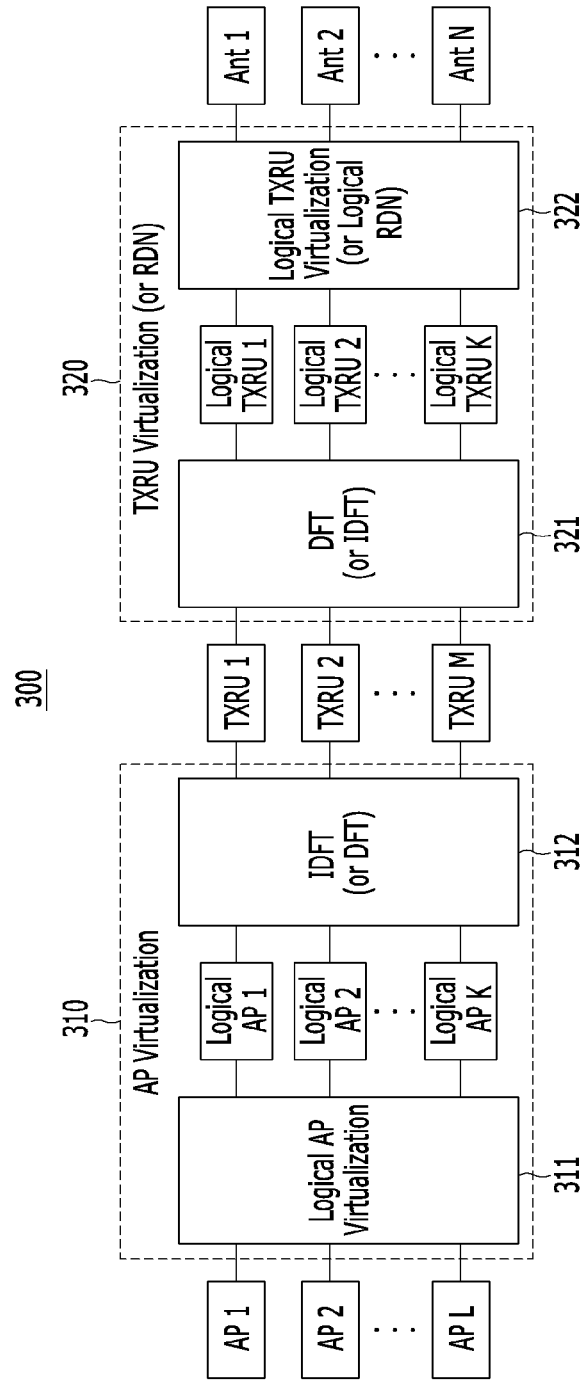
FIG. 2 is a view showing an antenna virtualization architecture according to an exemplary embodiment of the present invention.

FIG. 2 is a view showing an antenna virtualization architecture according to an exemplary embodiment of the present invention. In detail, FIG. 2 shows an overall architecture of the antenna virtualization.

The antenna virtualization apparatus 300 shown in FIG. 2 includes an antenna port virtualization unit 310 and a TXRU virtualization unit 320. The antenna port virtualization unit 310 may be configured through a combination of two independent complex linear input/output conversion devices 311 and 312. Likewise, the TXRU virtualization unit 320 may be configured through a combination of two independent complex linear input/output conversion devices 321 and 322.

The antenna port virtualization unit 310 includes a logical antenna port virtualization (logical AP virtualization) unit 311 and an IDFT (inverse discrete Fourier transform) operation unit 312. A physical path connecting the output of the logical antenna port virtualization unit 311 and the input of the IDFT operation unit 310 is defined as a logical antenna port (a logical AP).

The TXRU virtualization unit 320 includes a DFT (discrete Fourier transform) operation unit 321 and a logical TXRU virtualization unit 322. A physical path connecting the output of the DFT operation unit 321 and the input of the logical TXRU virtualization unit 322 is defined as a logical TXRU.

As described above, the antenna port virtualization unit 310 may be operated in the digital unit, and the TXRU virtualization unit 320 may be operated in the analog unit.

The DFT operation unit 321 and the logical TXRU virtualization unit 322 of the TXRU virtualization unit 320 may be respectively realized by a phase shifter.

In FIG. 2, L as the number of antenna ports AP1-APL, M as the number of TXRUs TXRU1-TXRUM, and N as the number of physical antenna elements Ant1-AntN may be the same as that shown in FIG. 1, and a number of logical antenna ports Logical AP1-Logical APK and a number of logical TXRUs Logical TXRU1-Logical TXRUK, that are newly defined, may be respectively K. Generally, it may be assumed that K is equal to or less than L (i.e., K≤L≤M≤N).

The four complex linear input/output conversion devices 311, 312, 321, and 322 included in the antenna virtualization apparatus 300 may be expressed as a complex matrix. In this case, the number of each input and each output of the complex linear input/output conversion devices 311, 312, 321, and 322 corresponds to a number of rows and columns of each complex matrix, and a complex number weight connecting an input i and an output j configure a row j and a column i of the complex matrix.

Accordingly, since the IDFT operation unit 312 of the antenna port virtualization unit 310 is a complex input/output device having the K inputs and the M outputs, thereby being expressed by the complex matrix having the M rows and the K columns. In detail, the IDFT operation unit 312 becomes an M-by-K partial matrix consisting of arbitrary K columns of an M-point IDFT matrix $F^{-1}$ having the size M, and this partial matrix is marked by C. Here, the IDFT matrix $F^{-1}$ is an inverse matrix of the DFT matrix F (the size is M) applied with normalization, and the DFT matrix F having the size M follows Equation 1. In this case, the arbitrary K columns of the IDFT matrix $F^{-1}$, for convenience, may be considered from the 1st column to the K-th column.

$$F = \frac{1}{\sqrt{M}} \begin{bmatrix} 1 & 1 & \cdots & 1 \\ 1 & w & \cdots & w^{M-1} \\ \vdots & \vdots & \ddots & w^{2(M-1)} \\ 1 & w^{M-1} & \cdots & w^{(M-1)(M-1)} \end{bmatrix},$$ [Equation 1]

where $w = e^{-\frac{2\pi i}{M}}$ and $i = \sqrt{-1}$

On the other hand, since the DFT operation unit 321 of the TXRU virtualization unit 320 is the complex input/output device having the M inputs and the K outputs, thereby being expressed as the complex matrix having the K rows and the M columns. In detail, the DFT operation unit 321 becomes a K-by-M partial matrix consisting the K rows of the DFT matrix F (the size is M) defined by Equation 1, and this partial matrix is indicated by D. In this case, the K rows of the DFT matrix F are rows corresponding to the K columns of the IDFT matrix $F^{-1}$ applied to the IDFT operation unit 312. That is, a number group of the K rows of the DFT matrix F is the same as a number group of the K columns of the IDFT matrix $F^{-1}$. When the IDFT operation unit 312 is applied with the 1st column to the K-th column of the IDFT matrix $F^{-1}$, the 1st row to the K-th row of the DFT matrix F are applied to the DFT operation unit 321.

According to the virtualization method shown in FIG. 2, each of the antenna ports AP1-APL is mapped to the physical antenna elements Ant1-AntN through the complex linear input/output conversion devices 311, 312, 321, and 322 of total four steps. That is, each of the antenna ports AP1-APL is mapped to the logical antenna ports Logical AP1-Logical APK by the logical antenna port virtualization of the logical antenna port virtualization unit 311, and each of the logical antenna ports Logical AP1-Logical APK is mapped to the TXRUs TXRU1-TXRUM by the IDFT operation of the IDFT operation unit 312. Also, each of the TXRUs TXRU1-TXRUM is mapped to the logical TXRUs Logical TXRU1-Logical TXRUK through the DFT operation unit 321, and each of the logical TXRUs Logical TXRU1-Logical TXRUK is mapped to the physical antenna elements Ant1-AntN by the logical TXRU virtualization of the logical TXRU virtualization unit 322.

On the other hand, the multiplication of the matrix D corresponding to the DFT operation unit 321 and the matrix C corresponding to the IDFT operation unit 312 becomes an identity matrix by a characteristic of the DFT matrix. That is, $D*C=I_K$, and in this case, $I_K$ represents the identity matrix having the size K. A physical meaning of the equation means that the effective or practical one-to-one mapping is established between the logical antenna ports Logical AP1-Logical APK as the input of the IDFT operation unit 312 and the logical TXRUs Logical TXRU1-Logical TXRUK as the output of the DFT operation unit 321 by the combination of the effects of the IDFT operation unit 312 and the DFT operation unit 321. This effective logical architecture will be described with reference to FIG. 3.

On the other hand, the matrix D corresponding to the DFT operation unit 321 and the matrix C corresponding to the IDFT operation unit 312 may be replaced by another matrix (for example, a unitary matrix have the mutually inverse matrix relation and the size of 1 for each element) having an inverse matrix relationship with each other.

Figure 3:
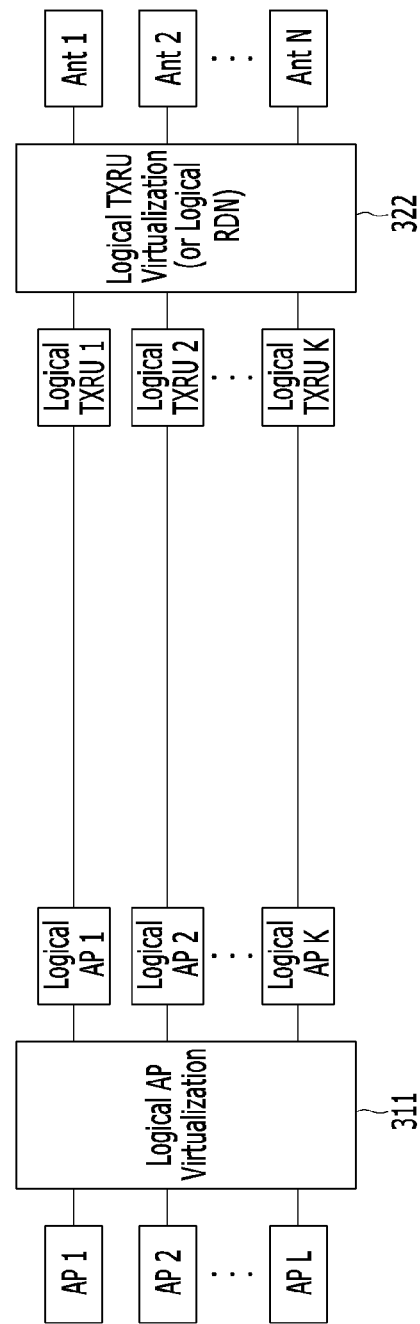
FIG. 3 is a view showing an effective logical architecture for antenna virtualization according to an exemplary embodiment of the present invention.

FIG. 3 is a view showing an effective logical architecture of antenna virtualization according to an exemplary embodiment of the present invention.

In detail, FIG. 3 shows the effective logical architecture (effective architecture over logical domain) reflected by the effect of the IDFT operation unit 312 and the DFT operation unit 321 of FIG. 2. The effective logical architecture shown in FIG. 3 is only one method for easy interpretation of the architecture shown in FIG. 2, and the effect thereof is the same. In FIG. 3, it is K≤L≤N.

In the effective logical architecture shown in FIG. 3, the IDFT operation unit 312 and the DFT operation unit 321 are omitted, and the logical antenna ports Logical AP1-Logical APK and the logical TXRUs Logical TXRU1-Logical TXRUK are equal. Accordingly, each of the antenna ports AP1-APL may be effectively interpreted to be mapped to the physical antenna elements Ant1-AntN through the complex linear input/output conversion devices 311 and 322 of two steps. That is, it may be interpreted that each of the antenna ports AP1-APL is mapped to the logical antenna ports Logical AP1-Logical APK by the logical antenna port virtualization of the logical antenna port virtualization unit 311, and each of the logical antenna ports Logical AP1-Logical APK, that is, each of the logical TXRUs Logical TXRU1-Logical TXRUK, is mapped to the physical antenna elements Ant1-AntN by the logical TXRU virtualization by the logical TXRU virtualization unit 322.

On the other hand, the IDFT operation of the antenna port virtualization unit 310 and the DFT operation of the TXRU virtualization unit 320 may be exchanged. That is, even if the antenna port virtualization unit 310 is applied with the 1st column to the K-th column of the DFT matrix F (defined like Equation 1) of the size M and simultaneously the TXRU virtualization unit 320 is applied with the 1st row to the K-th row of the IDFT matrix $F^{-1}$ of the size M, the entire effect is the same as the effect of the architecture of FIG. 2 or FIG. 3.

On the other hand, even if the DFT matrix F of the size M is replaced by an arbitrary M-by-M unitary matrix with elements the size of 1 (i.e., having a constant modulus amplitude the size of 1), the entire effect is the same as the effect depending on the architecture of FIG. 2 or FIG. 3. For example, in a case that M is an exponent of 2, the DFT matrix F may be replaced by a Hadamard matrix. When $M=2^k$, the normalized Hadamard matrix $H_M$ of the size 2 follows Equation 2 below.

$$H_1 = [1],$$
$$H_2 = \begin{bmatrix} 1 & 1 \\ 1 & -1 \end{bmatrix},$$
$$H_N = \begin{bmatrix} H_{2^k-1} & H_{2^k-1} \\ H_{2^k-1} & -H_{2^k-1} \end{bmatrix} = H_2 \otimes H_{2^k-1} \text{ for } 2 \le k \in M$$

[Equation 2]

In Equation 2, an ⊗ operator means a Kronecker product of the matrix. In this case, the IDFT operation unit 312 may use the K columns of the inverse matrix of $H_M$, and the DFT operation unit 321 may the K rows of $H_M$. On the other hand, the operation of the logical antenna port virtualization unit 311 may be expressed by an arbitrary complex matrix V having the K rows and the L columns, and here, the i-th and j-th element of the V is marked by $v_{ij}$. The element $v_{ij}$ is the complex number weight connecting the input j and the output i of the logical antenna port virtualization unit 311. The V executes a function of mapping the logical antenna ports Logical AP1-Logical APK to the antenna port of the reference signal.

Also, the operation of the logical TXRU virtualization unit 322 may be expressed by an arbitrary complex matrix W having the N rows and the K columns, and the i-th and j-th element of the complex matrix W is marked by $w_{ij}$. The element $w_{ij}$ is the complex number weight connecting the input j and the output i of the logical TXRU virtualization unit 322. The complex matrix W executes a function of mapping the logical TXRUs Logical TXRU1-Logical TXRUK to the physical antenna elements Ant1-AntN. That is, the complex matrix W executes a function of determining a beam pattern for each of the logical antenna ports Logical AP1-Logical APK.

Hereinafter, exemplary embodiments for the complex matrix V and W according to the virtualization architecture will be described.

Figure 4:
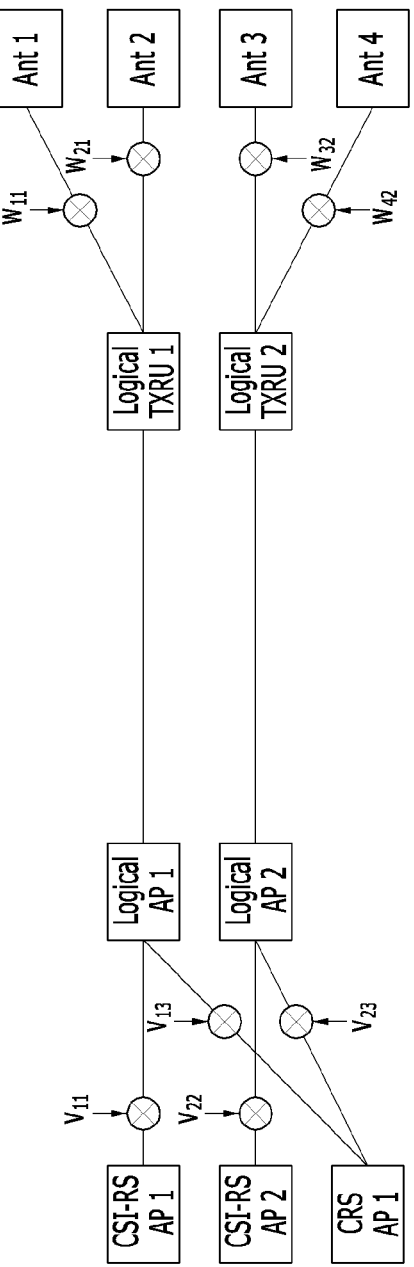
FIG. 4 is a view showing an antenna virtualization mapping architecture according to an exemplary embodiment of the present invention.

FIG. 4 is a view showing an antenna virtualization mapping architecture according to an exemplary embodiment of the present invention.

In detail, FIG. 4 shows a case that the logical TXRU virtualization follows the sub-array partition and the CRS and the CSI-RS share the logical TXRU virtualization.

FIG. 4 also shows a case that the number of the logical antenna ports Logical AP1 and Logical AP2 and the logical TXRUs Logical TXRU1 and Logical TXRU2 is two. The logical TXRUs Logical TXRU1 and Logical TXRU2 may be mapped to two among four physical antenna elements Ant1-Ant4. In detail, the element $w_{11}$ of the complex matrix W may be applied between the logical TXRU Logical TXRU1 and the physical antenna element Ant1, and the element $w_{21}$ of the complex matrix W may be applied between the logical TXRU Logical TXRU1 and the physical antenna element Ant2. Also, the element $w_{32}$ of the complex matrix W may be applied between the logical TXRU Logical TXRU2 and the physical antenna element Ant3, and the element $w_{42}$ of the complex matrix W may be applied between the logical TXRU Logical TXRU2 and the physical antenna element Ant4.

The CSI-RS antenna ports CSI-RS AP1 and CSI-RS AP2 may be mapped to the logical antenna ports Logical AP1 and Logical AP2 one-to-one. In detail, the element $v_{11}$ of the complex matrix V may be applied between the CSI-RS antenna port CSI-RS AP1 and the logical antenna port Logical AP1, and the element $v_{22}$ of the complex matrix V may be applied between the CSI-RS antenna port CSI-RS AP2 and the logical antenna port Logical AP2.

The CRS antenna port CRS AP1 may be mapped to both logical antenna ports Logical AP1 and Logical AP2 (i.e., one-to-many mapping). In detail, the element $v_{13}$ of the complex matrix V may be applied between the CRS antenna port CRS AP1 and the logical antenna port Logical AP1, and the element $v_{23}$ of the complex matrix V may be applied between the CRS antenna port CRS AP1 and the logical antenna port Logical AP2. That is, the CSI-RS antenna ports CSI-RS AP1 and CSI-RS AP2 and the CRS antenna port CRS AP1 may share the logical antenna ports Logical AP1 and Logical AP2.

The number of TXRUs required for the realization of the exemplary embodiment shown in FIG. 4 is two. According to the exemplary embodiment of FIG. 4, two CSI-RS antenna ports CSI-RS AP1 and CSI-RS AP2 may be transmitted through a wide beam, and the CRS antenna port CRS AP1 may be transmitted through a narrow beam having relatively large direction directivity. Coverage of two CSI-RS antenna ports CSI-RS AP1 and CSI-RS AP2 may be overlapped.

Figure 5:
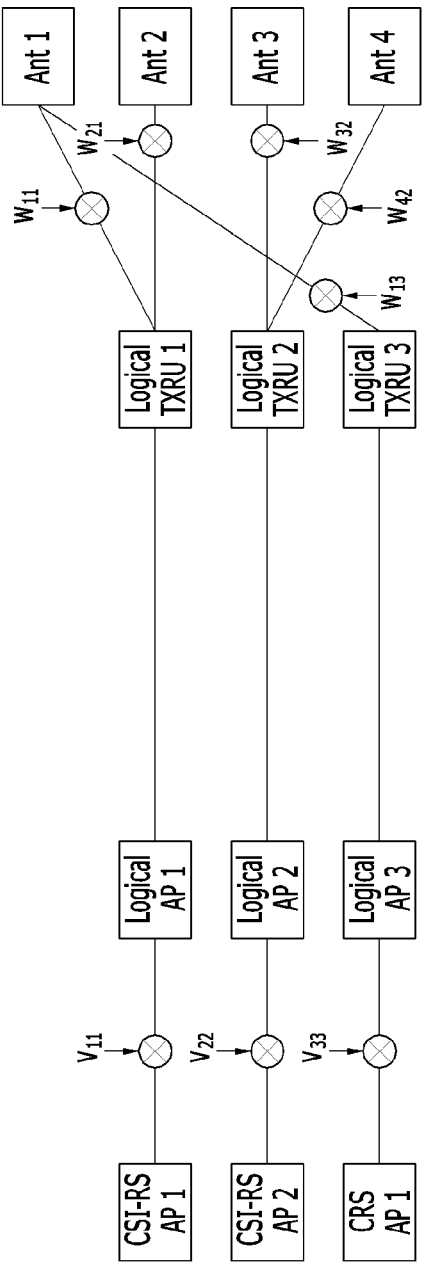
FIG. 5 is a view showing an antenna virtualization mapping architecture according to another exemplary embodiment of the present invention.

FIG. 5 is a view showing an antenna virtualization mapping architecture according to another exemplary embodiment of the present invention.

In detail, FIG. 5 shows a case that the logical TXRU virtualization follows the sub-array partition model like the exemplary embodiment of FIG. 4, but the CRS and the CSI-RS are applied with different logical TXRU virtualizations. FIG. 5 shows the case that the number of the logical antenna ports Logical AP1-Logical AP3 and the logical TXRUs Logical TXRU1-Logical TXRU3 is three.

The logical TXRUs Logical TXRU1 and Logical TXRU2 may be respectively mapped to two among four physical antenna elements Ant1-Ant4, and the logical TXRUs Logical TXRU3 may be mapped to one physical antenna element Ant1. In detail, the element $w_{11}$ of the complex matrix W may be applied between the logical TXRU Logical TXRU1 and the physical antenna element Ant1, and the element $w_{21}$ of the complex matrix W may be applied between the logical TXRU Logical TXRU1 and the physical antenna element Ant2. Also, the element $w_{32}$ of the complex matrix W may be applied between the logical TXRU Logical TXRU2 and the physical antenna element Ant3, and the element $w_{42}$ of the complex matrix W may be applied between the logical TXRU Logical TXRU2 and the physical antenna element Ant4. Further, the element $w_{13}$ of the complex matrix W may be applied between the logical TXRU Logical TXRU3 and the physical antenna element Ant1.

Two CSI-RS antenna ports CSI-RS AP1 and CSI-RS AP2 may be mapped to the first and second logical antenna ports Logical AP1 and Logical AP2 by one-to-one, respectively. In detail, the element $v_{11}$ of the complex matrix V may be applied between the CSI-RS antenna port CSI-RS AP1 and the logical antenna port Logical AP1, and the element $v_{22}$ of the complex matrix V may be applied between the CSI-RS antenna port CSI-RS AP2 and the logical antenna port Logical AP2.

The CRS antenna port CRS AP1 may be mapped to the third logical antenna port Logical AP3 by one-to-one. In detail, the element $v_{33}$ of the complex matrix V may be applied between the CRS antenna port CRS AP1 and the logical antenna port Logical AP3.

The number of TXRUs required for realizing the exemplary embodiment of FIG. 5 is three. According to the exemplary embodiment of FIG. 5, the CSI-RS antenna ports CSI-RS AP1 and CSI-RS AP2 may be transmitted through the wide beam, and the CRS antenna port CRS AP1 may be transmitted through the relatively wider beam.

Figure 6:
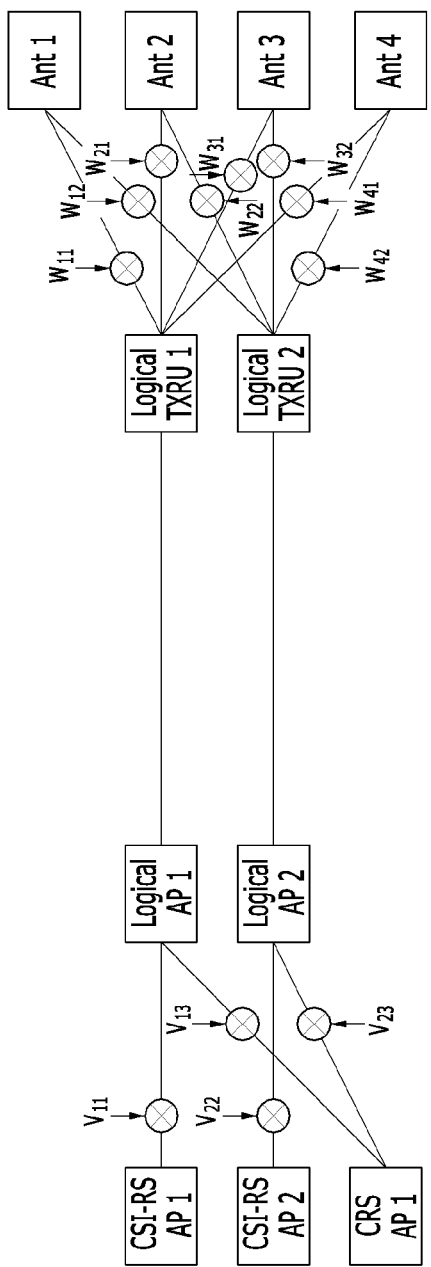
FIG. 6 is a view showing an antenna virtualization mapping architecture according to another exemplary embodiment of the present invention.

FIG. 6 is a view showing an antenna virtualization mapping architecture according to another exemplary embodiment of the present invention.

In detail, FIG. 6 shows the case that the logical TXRU virtualization follows the full connection model and the CRS and the CSI-RS share the logical TXRU virtualization.

FIG. 6 shows the case that the logical antenna ports Logical AP1 and Logical AP2 and the logical TXRUs Logical TXRU1 and Logical TXRU2 are respectively two. The logical TXRUs Logical TXRU1 and Logical TXRU2 may be mapped to all four physical antenna elements Ant1-Ant4. In detail, the element $w_{11}$ of the complex matrix W may be applied between the logical TXRU Logical TXRU1 and the physical antenna element Ant1, the element $w_{21}$ of the complex matrix W may be applied between the logical TXRU Logical TXRU1 and the physical antenna element Ant2, the element $w_{31}$ of the complex matrix W may be applied between the logical TXRU Logical TXRU1 and the physical antenna element Ant3, and the element $w_{41}$ of the complex matrix W may be applied between the logical TXRU Logical TXRU1 and the physical antenna element Ant4. Also, the element $w_{12}$ of the complex matrix W may be applied between the logical TXRU Logical TXRU2 and the physical antenna element Ant1, the element $w_{22}$ of the complex matrix W may be applied between the logical TXRU Logical TXRU2 and the physical antenna element Ant2, the element $w_{32}$ of the complex matrix W may be applied between the logical TXRU Logical TXRU2 and the physical antenna element Ant3, and the element $w_{42}$ of the complex matrix W may be applied between the logical TXRU Logical TXRU2 and the physical antenna element Ant4.

Accordingly, the narrow beam may be formed in each of the logical antenna ports Logical AP1 and Logical AP2.

The CSI-RS antenna ports CSI-RS AP1 and CSI-RS AP2 may be mapped to the logical antenna ports Logical AP1 and Logical AP2 by one-to-one. In detail, the element $v_{11}$ of the complex matrix V may be applied between the CSI-RS antenna port CSI-RS AP1 and the logical antenna port Logical AP1, and the element $v_{22}$ of the complex matrix V may be applied between the CSI-RS antenna port CSI-RS AP2 and the logical antenna port Logical AP2.

The CRS antenna port CRS AP1 may be mapped to both logical antenna ports Logical AP1 and Logical AP2. In detail, the element $v_{13}$ of the complex matrix V may be applied between the CRS antenna port CRS AP1 and the logical antenna port Logical AP1, and the element $v_{23}$ of the complex matrix V may be applied between the CRS antenna port CRS AP1 and the logical antenna port Logical AP2.

The number of TXRUs required for realizing the exemplary embodiment of FIG. 6 is two. According to the exemplary embodiment of FIG. 6, two CSI-RS antenna ports CSI-RS AP1 and CSI-RS AP2 may be transmitted through the narrow beam having the direction directivity, and each beam may direct the different channel space directions.

Figure 7:
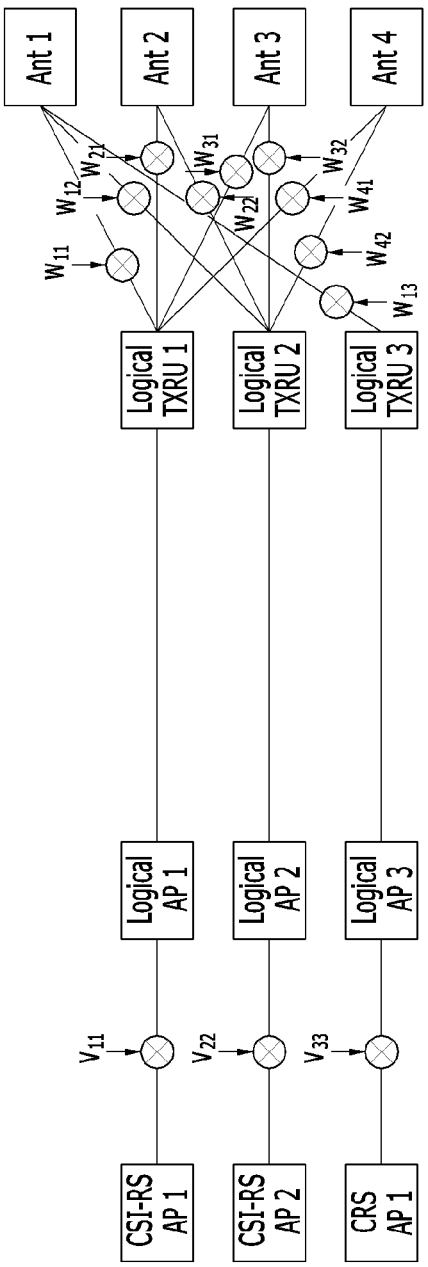
FIG. 7 is a view showing an antenna virtualization mapping architecture according to another exemplary embodiment of the present invention.

FIG. 7 is a view showing an antenna virtualization mapping architecture according to another exemplary embodiment of the present invention.

In detail, FIG. 7 shows a case that the logical TXRU virtualization follows the full connection model and the CRS and the CSI-RS may be applied with the different logical TXRU virtualizations. FIG. 7 shows a case that the number of the logical antenna ports Logical AP1-Logical AP3 and the logical TXRUs Logical TXRU1-Logical TXRU3 is three.

The CSI-RS antenna port virtualization and the CRS antenna port virtualization is the same as the exemplary embodiment of FIG. 5.

In FIG. 7, the first and second logical TXRUs Logical TXRU1 and Logical TXRU2 that are equal to the first and second CSI-RS antenna ports CSI-RS AP1 and AP2 are applied with the full connection model, and the third logical TXRU Logical TXRU3 that is equal to the CRS antenna port CRS AP1 is applied with one-to-one mapping.

In detail, the element $v_{11}$ of the complex matrix V may be applied between the CSI-RS antenna port CSI-RS AP1 and the logical antenna port Logical AP1, and the element $v_{22}$ of the complex matrix V may be applied between the CSI-RS antenna port CSI-RS AP2 and the logical antenna port Logical AP2. The element $v_{33}$ of the complex matrix V may be applied between the CRS antenna port CRS AP1 and the logical antenna port Logical AP3.

The element $w_{11}$ of the complex matrix W may be applied between the logical TXRU Logical TXRU1 and the physical antenna element Ant1, the element $w_{21}$ of the complex matrix W may be applied between the logical TXRU Logical TXRU1 and the physical antenna element Ant2, the element $w_{31}$ of the complex matrix W may be applied between the logical TXRU Logical TXRU1 and the physical antenna element Ant3, and the element $w_{41}$ of the complex matrix W may be applied between the logical TXRU Logical TXRU1 and the physical antenna element Ant4.

The element $w_{12}$ of the complex matrix W may be applied between the logical TXRU Logical TXRU2 and the physical antenna element Ant1, the element $w_{22}$ of the complex matrix W may be applied between the logical TXRU Logical TXRU2 and the physical antenna element Ant2, the element $w_{32}$ of the complex matrix W may be applied between the logical TXRU Logical TXRU2 and the physical antenna element Ant3, and the element $w_{42}$ of the complex matrix W may be applied between the logical TXRU Logical TXRU2 and the physical antenna element Ant4.

The element $w_{13}$ of the complex matrix W may be applied between the logical TXRU Logical TXRU3 and the physical antenna element Ant1.

According to the exemplary embodiment of FIG. 7, two CSI-RS antenna ports CSI-RS AP1 and CSI-RS AP2 may be transmitted through the narrow beam having the direction directivity, and the CRS antenna port CRS AP1 may be transmitted through the wide beam having the relatively small direction directivity. The number of TXRUs required for realizing the exemplary embodiment of FIG. 7 is three.

On the other hand, in the virtualization method according to an exemplary embodiment of the present invention, the logical antenna ports Logical AP1-Logical APK are respectively connected to the M TXRUs TXRU1-TXRUM by the IDFT operation, and the TXRUs TXRU1-TXRUM respectively have 1/M of the entire power such that the entire power may be allocated to the logical antenna ports Logical AP1-Logical APK. In this case, if it is assumed that 2-norm as a size of each column vector of the complex matrix V is 1, the entire power may be allocated to the antenna ports AP1-APL that are not the logical antenna ports Logical AP1-Logical APK. This is established regardless of whether any method among the CDM, the FDM, and the TDM as the multiplexing method between the antenna ports AP1-APL is used. In the case of the CDM, the plurality of ports are transmitted from the same RE such that there is a drawback that a peak-to-average-power ratio (PAPR) may be increased in the TXRU terminal. However, this drawback may be solved through a method of virtualizing each port by using the different TXRU groups without the application of the virtualization architecture between the ports applied with the CDM. In an orthogonal frequency division multiplexing (OFDM) system including the LTE, different complex matrices V from each other may be applied for each subcarrier, and in this case, it may be assumed that 2-norm as the size of each column vector of the complex matrix V is an average of 1.

On the other hand, in the above-described exemplary embodiment, it is also possible to ensure full power utilization for each of the CSI-RS antenna port and the CRS antenna port. On the other hand, the mapping rule of the CSI-RS antenna port on the current LTE standard is designed under an assumption that the CSI-RS antenna port and the TXRU are mapped one-to-one, however the virtualization method according to an exemplary embodiment of the present invention may also be applied. That is, as the maximum of eight CSI-RS antenna ports respectively correspond to the logical antenna ports one-to-one, each CSI-RS antenna port may be mapped to eight TXRUs through the weight values of each column vector of the IDFT matrix having the size 8. Accordingly, each CSI-RS antenna port may transmit a pilot symbol by using the full transmission power (for example, CSI-RS EPRE) through all eight TXRUs.

In a conventional case assuming one-to-one correspondence between the CSI-RS antenna port and the TXRU, if the number of CSI-RS antenna ports is 4 or 8, the CSI-RS power boost may be generated up to 3 dB or 6 dB by the FDM. However, according to an exemplary embodiment of the present invention, since the full transmission power may be secured in the RE in which each CSI-RS antenna port is transmitted, the CSI-RS power boost is not generated.

Also, the CSI-RS antenna ports #15 and #16 on the current standard are applied with the CDM as a port-to-port multiplexing method, thereby being transmitted through the same two REs. In the present specification, to transmit the antenna port may include to transmit the signal of the antenna port. If the virtualization method according to an exemplary embodiment of the present invention is applied to the CSI-RS antenna ports #15 and #16, since a power level may be different between the output signals of the IDFT operation unit 312, the PAPR of the input signal inflowing to the power amplifier of each TXRU may be increased.

To prevent this, as described above, the method of mapping the CSI-RS antenna ports #15 and #16 to the different TXRU groups may be considered. For example, when eight CSI-RS antenna ports on the current standard are transmitted by using eight TXRUs, the virtualization method according to an exemplary embodiment of the present invention may be applied to the CSI-RS antenna ports #15, #17, #19, and #21 by using four TXRUs among the eight TXRUs, and the virtualization method according to an exemplary embodiment of the present invention may be applied to the CSI-RS antenna ports #16, #18, #20, and #22 by using the remaining four TXRUs. Accordingly, since the CSI-RS antenna ports #15, #17, #19, and #21 are transmitted through the different REs, the increasing of the PAPR is not generated. The case of the CSI-RS antenna ports #16, #18, #20, and #22 is the same.

On the other hand, depending on the usage of the greater number of TXRUs in the FD-MIMO system, the transmission for the CSI-RS antenna ports (for example, 16, 32, or 64 CSI-RS antenna ports) of more than 8 may be required. In this case, if the virtualization method according to an exemplary embodiment of the present invention is applied, the base station may ensure the full power utilization for each CSI-RS antenna port by the same principle, even without relying on the CSI-RS pattern expansion by the CDM or the FDM (i.e., without relying on the method M10).

On the other hand, in the 2-dimensional active array antenna-based FD-MIMO, a plurality of CSI-RS antenna ports may configure the 2-dimensional array.

Figure 8:
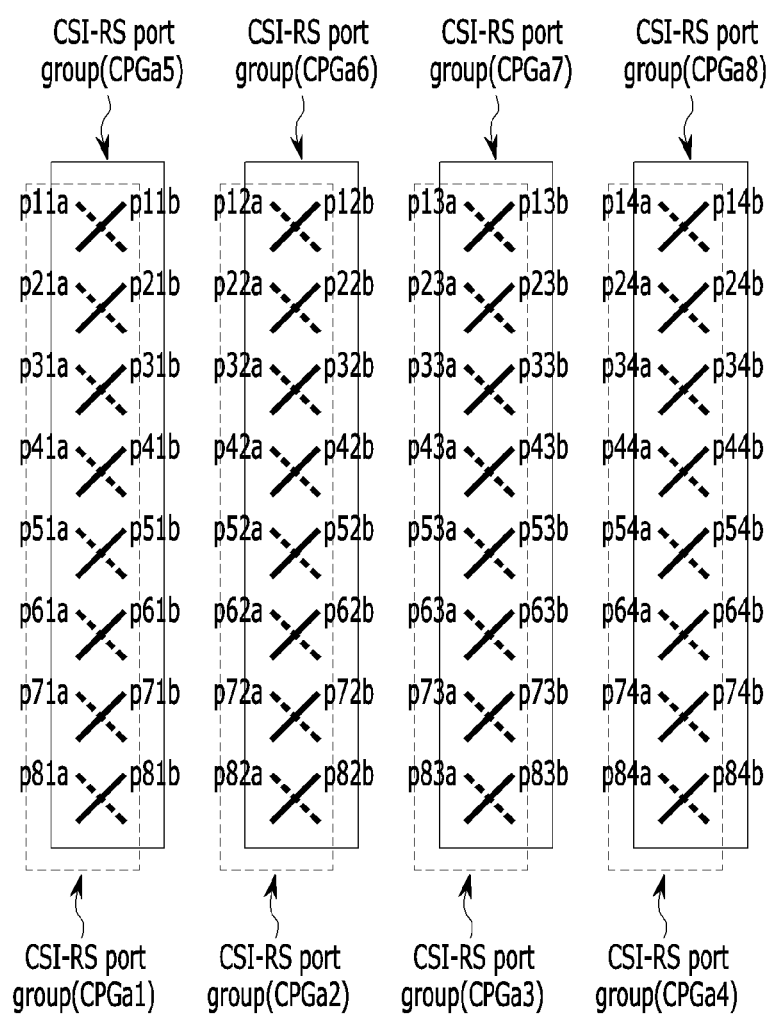
FIG. 8 is a view showing a 2-dimensional CSI-RS antenna port array and a CSI-RS antenna port virtualization group according to an exemplary embodiment of the present invention.

FIG. 8 is a view showing a 2-dimensional CSI-RS antenna port array and a CSI-RS antenna port virtualization group according to an exemplary embodiment of the present invention.

In detail, FIG. 8 shows a case that eight and four CSI-RS antenna ports are respectively disposed in a vertical axis and a horizontal axis and two CSI-RS antenna ports are disposed in a polarization axis when the total number of CSI-RS antenna ports is 64. Here, the polarization axis for the CSI-RS antenna port array means an axis consisting of a polarization (for example, 0 degrees to 180 degrees) of the physical antenna element mapped with the CSI-RS antenna port.

The number of TXRUs required for the exemplary embodiment of FIG. 8 is 64. In this case, the virtualization method according to an exemplary embodiment of the present invention may be applied to all 64 CSI-RS antenna ports. This corresponds to a case that the value of M in FIG. 2 is 64.

Also, after the 64 CSI-RS antenna ports are divided into a plurality of groups, the virtualization method according to an exemplary embodiment of the present invention (for example, the antenna virtualization method of FIG. 2) may be applied to each CSI-RS antenna port group. For example, as shown in FIG. 8, the eight CSI-RS antenna ports having the same polarization in each column may be designated as each CSI-RS antenna port group. Accordingly, a total of eight CSI-RS antenna port groups CPGa1-CPGa8 are generated.

That is, the eight CSI-RS antenna ports p11a, p21a, p31a, p41a, p51a, p61a, p71a, and p81a may be designated as a CSI-RS antenna port group CPGa1, and the eight CSI-RS antenna ports p11b, p21b, p31b, p41b, p51b, p61b, p71b, and p81b may be designated as a CSI-RS antenna port group CPGa5. Likewise, the eight CSI-RS antenna ports p12a, p22a, p32a, p42a, p52a, p62a, p72a, and p82a may be designated as a CSI-RS antenna port group CPGa2, and the eight CSI-RS antenna ports p12b, p22b, p32b, p42b, p52b, p62b, p72b, and p82b may be designated as a CSI-RS antenna port group CPGa6. Likewise, the eight CSI-RS antenna ports p13a, p23a, p33a, p43a, p53a, p63a, p73a, and p83a may be designated as a CSI-RS antenna port group CPGa3, and the eight CSI-RS antenna ports p13b, p23b, p33b, p43b, p53b, p63b, p73b, and p83b may be designated as a CSI-RS antenna port group CPGa7. Likewise, eight CSI-RS antenna ports p14a, p24a, p34a, p44a, p54a, p64a, p74a, and p84a may be designated as a CSI-RS antenna port group CPGa4, and the eight CSI-RS antenna ports p14b, p24b, p34b, p44b, p54b, p64b, p74b, and p84b may be designated as a CSI-RS antenna port group CPGa8.

Likewise, the 64 TXRUs may also be divided into eight TXRU groups without an intersection with each other, and each TXRU group may include eight TXRUs. In this case, for each of the CSI-RS antenna port groups CPGa1-CPGa8, the different TXRU groups may be used and the virtualization method according to an exemplary embodiment of the present invention may be applied. That is, in each of the CSI-RS antenna port groups CPGa1-CPGa8, the virtualization (for example, the antenna virtualization method of FIG. 2) based on the IDFT and DFT matrix having the size 8 may be applied, and the virtualization may be independently applied between the CSI-RS antenna port groups CPGa1-CPGa8. In this case, the conventional multiplexing method of the CDM and the FDM may be applied between the eight CSI-RS antenna ports (for example, p11a, p11b, p12a, p12b, p13a, p13b, p14a, and p14b) arranged in the horizontal axis and the polarization axis in the same row, and the arbitrary 'port-to-port' multiplexing method may be applied between the eight CSI-RS antenna ports arranged in the vertical axis in the same column. For example, the TDM method may be applied between the eight CSI-RS antenna ports p11a, p21a, p31a, p41a, p51a, p61a, p71a, and p81a arranged in the vertical axis.

On the other hand, in the FD-MIMO technique, a method (hereinafter referred to as 'a virtual sectorization') of managing a plurality of virtual sectors in one cell by using a plurality of beamformed CSI-RS resources having different directionalities may be considered. In this case, coverage of each CSI-RS beam generates one sector.

The virtual sectorization method may be applied in the horizontal axis or the vertical axis, or may be applied in both the horizontal axis and the vertical axis. For example, when generating the plurality of virtual sectors in the vertical axis, the wide beam may be applied to the CSI-RS for each virtual sector to have the wide CSI-RS coverage in the horizontal axis, and the narrow and sharp beam may be applied to the CSI-RS for each virtual sector to have the relatively narrow CSI-RS coverage in the vertical axis. In this case, to transmit a plurality of CSI-RS beams having the different directionalities in the vertical axis from the base station, the CSI-RS antenna port virtualization of the vertical axis may be frequency-selectively applied. In this case, as shown in FIG. 8, when the virtualization method according to an exemplary embodiment of the present invention is applied to the vertical axis, to frequency-selectively apply the CSI-RS antenna port virtualization, the logical antenna port virtualization in the digital unit is required. Accordingly, the PAPR of the OFDM signal transmitted to each TXRU may be increased.

To prevent this, as opposed to the illustration of the FIG. 8, the virtualization method according to an exemplary embodiment of the present invention may be applied between the CSI-RS antenna ports arranged in the horizontal axis and the polarization axis, and the one-to-one mapping as the virtualizing of the digital unit may be applied between the CSI-RS antenna ports arranged in the vertical axis. This will be described with reference to FIG. 9.

Figure 9:
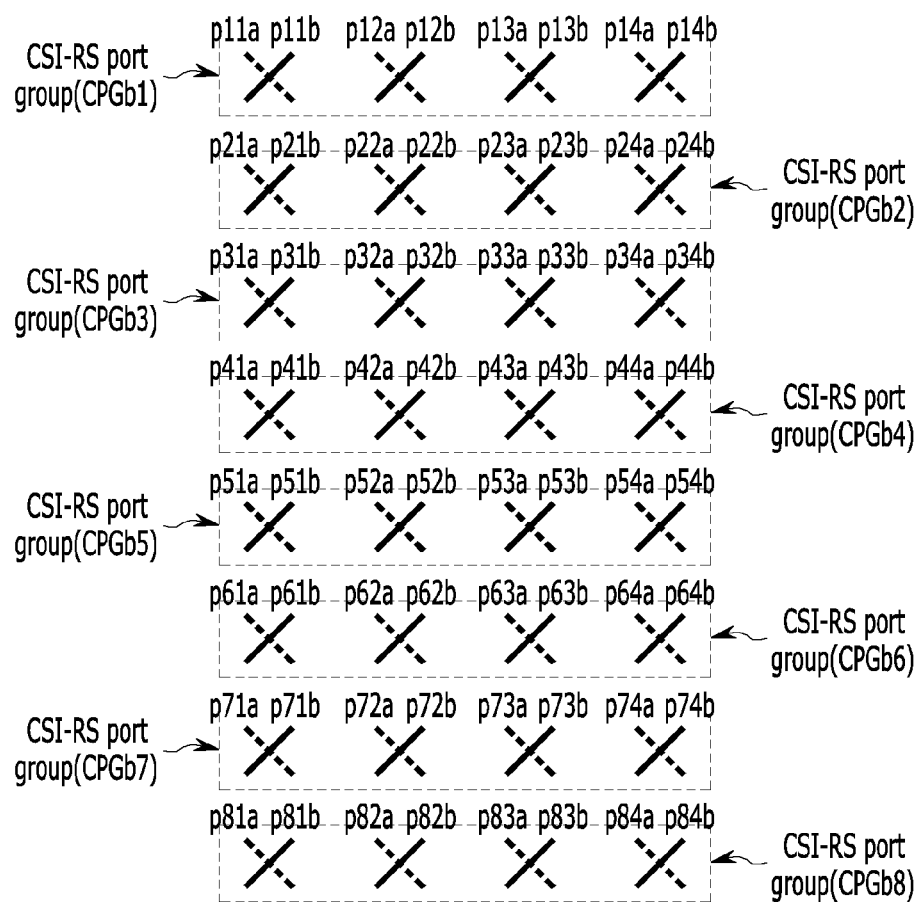
FIG. 9 is a view showing a 2-dimensional CSI-RS antenna port array and a CSI-RS antenna port virtualization group according to another exemplary embodiment of the present invention.

FIG. 9 is a view showing a 2-dimensional CSI-RS antenna port array and a CSI-RS antenna port virtualization group according to another exemplary embodiment of the present invention.

In FIG. 9, the eight CSI-RS antenna ports p11a, p11b, p12a, p12b, p13a, p13b, p14a, and p14b may be designated as a CSI-RS antenna port group CPGb1, and the eight CSI-RS antenna ports p21a, p21b, p22a, p22b, p23a, p23b, p24a, and p24b may be designated as a CSI-RS antenna port group CPGb2. Likewise, the eight CSI-RS antenna ports p31a, p31b, p32a, p32b, p33a, p33b, p34a, and p34b may be designated as a CSI-RS antenna port group CPGb3, and the eight CSI-RS antenna ports p41a, p41b, p42a, p42b, p43a, p43b, p44a, and p44b may be designated as a CSI-RS antenna port group CPGb4. Likewise, the eight CSI-RS antenna ports p51a, p51b, p52a, p52b, p53a, p53b, p54a, and p54b may be designated as a CSI-RS antenna port group CPGb5, and the eight CSI-RS antenna ports p61a, p61b, p62a, p62b, p63a, p63b, p64a, and p64b may be designated as a CSI-RS antenna port group CPGb6. Likewise, the eight CSI-RS antenna ports p71a, p71b, p72a, p72b, p73a, p73b, p74a, and p74b may be designated as a CSI-RS antenna port group CPGb7, and the eight CSI-RS antenna ports p81a, p81b, p82a, p82b, p83a, p83b, p84a, and p84b may be designated as a CSI-RS antenna port group CPGb8.

Like the exemplary embodiment of FIG. 8, in each of the CSI-RS antenna port groups CPGa1-CPGa8, the virtualization (for example, the antenna virtualization method of FIG. 2) based on the IDFT and DFT matrix having the size 8 may be applied, and the virtualization may be independently applied between the CSI-RS antenna port groups CPGa1-CPGa8.

In the exemplary embodiment of FIG. 9, the arbitrary 'port-to-port multiplexing method' may be applied between the eight CSI-RS antenna ports (for example, p11a, p11b, p12a, p12b, p13a, p13b, p14a, and p14b) arranged in the horizontal axis and the polarization axis in the same row, and the multiplexing method of the conventional CDM and FDM may be applied between the eight CSI-RS antenna ports (for example, p11a, p21a, p31a, p41a, p51a, p61a, p71a, and p81a) arranged in the vertical axis in the same column. That is, the base station configures the eight CSI-RS antenna ports (for example, p11a, p21a, p31a, p41a, p51a, p61a, p71a, and p81a) arranged in the vertical axis through the CSI-RS resource configuration for the eight CSI-RS antenna ports on the current standard, thereby applying the CSI-RS pattern based on the CDM and the FDM to the corresponding eight CSI-RS antenna ports (for example, p11a, p21a, p31a, p41a, p51a, p61a, p71a, and p81a).

In the exemplary embodiment of FIG. 9, since four columns exist for each polarization, the eight CSI-RS resource configurations may be required for total eight columns. In this case, the CSI-RS antenna port number is increased in the vertical axis direction in each CSI-RS resource. On the other hand, a 1-dimension codebook on the current LTE standard assumes mapping the CSI-RS antenna port index firstly to the space axis (for example, the horizontal axis, the vertical axis) and secondly to the polarization axis. When the CSI measurement and report is executed for each virtual sector in the virtual sectorization method, it may be advantageous for the CSI-RS antenna port index to be firstly mapped to the horizontal axis and the polarization axis and to be secondly mapped to the vertical axis.

Accordingly, a method of reconfiguring the CSI-RS antenna port number (or the index) on the 2-dimensional CSI-RS antenna port array entirely configured by the terminal may be necessary. As described above, when the virtual sectorization for the vertical axis is used, a method of recognizing that the CSI-RS antenna port index is sequentially increased according to an order of the horizontal axis, the polarization axis, and the vertical axis on the entire 2-dimensional array through the terminal may be considered. Also, a method of recognizing that the CSI-RS antenna port index is sequentially increased according to the order of the horizontal axis and the polarization axis on the 1-dimension array corresponding to each row through the terminal may be considered.

Figure 10:
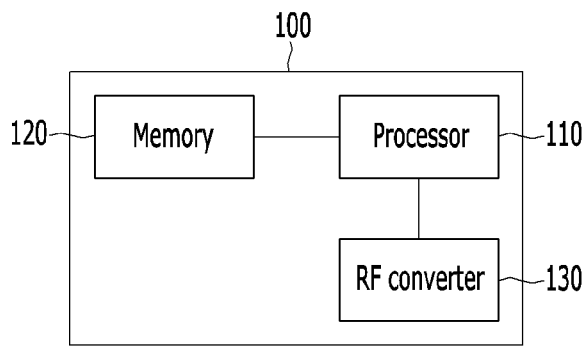
FIG. 10 is a view showing a transmitter according to an exemplary embodiment of the present invention.

FIG. 10 is a view showing a transmitter according to an exemplary embodiment of the present invention.

In detail, the transmitter 100 includes a processor 110, a memory 120, and an RF converter 130.

The processor 110 may be configured to realize the procedures, the functions, and the methods (for example, the antenna virtualization method, etc.) described in connection with the transmission of the station or the transmission of the terminal in the present specification. The processor 110 may control each configuration of the transmitter 100.

The memory 120 is connected to the processor 110 and stores various information related to the operation of the processor 110.

The RF converter 130 is connected to the processor 110 and transmits and receives the wireless signals. Also, the transmitter 100 may have a single antenna or a multi-antenna.

The transmitter 100 may include the antenna virtualization apparatus 300. The transmitter 100 may be the base station or the terminal.

Figure 11:
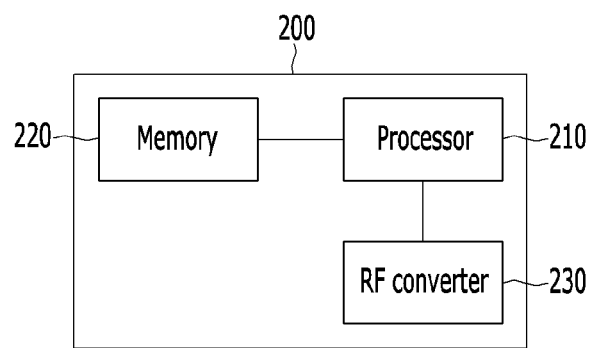
FIG. 11 is a view showing a receiver according to an exemplary embodiment of the present invention.

FIG. 11 is a view showing a receiver according to an exemplary embodiment of the present invention.

In detail, the receiver 200 includes a processor 210, a memory 220, and an RF converter 230.

The processor 210 may be configured to realize the procedures, the functions, and the methods described in connection with the reception of the terminal or the reception of the base station in the present specification. The processor 210 may control each configuration of the receiver 200.

The memory 220 is connected to the processor 210 and stores various information related to the operation of the processor 210.

The RF converter 230 is connected to the processor 210 and transmits and receives the wireless signals. Also, the receiver 200 may have the single antenna or the multi-antenna. The receiver 200 may be the terminal or the base station.

In an exemplary embodiment of the present invention, transmitting/receiving the reference signal is described, however this is only one example. An exemplary embodiment of the present invention may be applied to a case of transmitting/receiving a signal (for example, a data signal, a control signal, etc.) different from the reference signal.

According to an exemplary embodiment of the present invention, by efficiently designing the mapping of the antenna port virtualization and the mapping of the transceiver unit virtualization, full transmission power of each CSI-RS antenna port may be ensured.

Further, according to an exemplary embodiment of the present invention, the antenna virtualization method for the wireless communication system using the multi-antenna may be provided.

Also, according to an exemplary embodiment of the present invention, the antenna virtualization method that may be applied to the 1-dimensional antenna port array and the 2-dimensional antenna port array for FD-MIMO (full-dimension MIMO) may be provided.

In addition, according to an exemplary embodiment of the present invention, the antenna virtualization method that is useful to the system having the TXRU of a large number may be provided.

Further, according to an exemplary embodiment of the present invention, the signal may be transmitted/received by utilizing the multi-antenna in the wireless communication system.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A signal transmission method of a transmitter, comprising:
   mapping an antenna port to a logical antenna port through a first virtualization;
   mapping the logical antenna port to a transceiver unit (TXRU) through a first operation;
   mapping the TXRU to a logical TXRU through a second operation; and
   mapping the logical TXRU to a physical antenna element through a second virtualization,
   wherein a first complex matrix corresponding to the first operation is a unitary matrix of which a size of each element is 1 and is an inverse matrix of a second complex matrix corresponding to the second operation.

2. The signal transmission method of claim 1, wherein:
   the logical antenna port is a physical path for a result of the first virtualization to be an input for the first operation; and
   the logical TXRU having the same number as the number of the logical antenna ports is a physical path for a result of the second operation to be an input for the second virtualization.

3. The signal transmission method of claim 1, wherein:
   the first complex matrix is generated based on one of a discrete Fourier transform (DFT) matrix and an inverse discrete Fourier transform (IDFT) matrix; and
   the second complex matrix is generated based on the other of the DFT matrix and the IDFT matrix.

4. The signal transmission method of claim 1, wherein:
   the first complex matrix is generated based on one of a Hadamard matrix and an inverse matrix of the Hadamard matrix; and
   the second complex matrix is generated based on the other of the Hadamard matrix and the inverse matrix of the Hadamard matrix.

5. The signal transmission method of claim 3, wherein the DFT matrix is defined by Equation 1 below,
the first complex matrix has rows of the same number as the number of the TXRUs and columns of the same number as the number of the logical antenna ports, and the second complex matrix has rows of the same number as the number of the logical TXRUs and columns of the same number as the number of the TXRUs:

$$F = \frac{1}{\sqrt{M}} \begin{bmatrix} 1 & 1 & \cdots & 1 \\ 1 & w & \cdots & w^{M-1} \\ \vdots & \vdots & \ddots & w^{2(M-1)} \\ 1 & w^{M-1} & \cdots & w^{(M-1)(M-1)} \end{bmatrix}, \quad [\text{Equation 1}]$$

where $w = e^{-\frac{2\pi i}{M}}$ and $i = \sqrt{-1}$ $$\begin{pmatrix} F: \text{the } DFT \text{ matrix,} \\ M: \text{the number of the } TXRUs \end{pmatrix}.$$

6. The signal transmission method of claim 4, wherein: the Hadamard matrix is defined by Equation 1 below:

$$H_1 = [1], \quad [\text{Equation 1}]$$

$$H_2 = \begin{bmatrix} 1 & 1 \\ 1 & -1 \end{bmatrix},$$

$$H_M = \begin{bmatrix} H_{2^{k-1}} & H_{2^{k-1}} \\ H_{2^{k-1}} & -H_{2^{k-1}} \end{bmatrix} = H_2 \otimes H_{2^{k-1}} \text{ for } 2 \leq k \in M$$

$$\begin{pmatrix} H_M: \text{the Hadamard matrix,} \\ M: \text{the number of the } TXRUs, \\ \otimes: \text{Kronecker product of a matrix} \end{pmatrix}.$$

7. The signal transmission method of claim 1, wherein:
the first virtualization corresponds to a complex matrix having rows of the same number as the number of the logical antenna ports and columns of the same number as the number of the antenna ports; and
the second virtualization corresponds to a complex matrix having rows of the same number as the number of the physical antenna elements and columns of the same number as the number of the logical TXRUs.

8. The signal transmission method of claim 1, wherein the antenna port includes a first antenna port for a first signal and a second antenna port for a second signal, and
the mapping of the antenna port to the logical antenna port includes
making the first antenna port and the second antenna port share the logical antenna port through the first virtualization.

9. The signal transmission method of claim 8, wherein the process for making the first antenna port and the second antenna port share the logical antenna port includes:
one-to-one mapping the first antenna port to the logical antenna port through the first virtualization; and
one-to-many mapping the second antenna port to the logical antenna port through the first virtualization.

10. The signal transmission method of claim 1, wherein the antenna port includes a first antenna port for a first signal and a second antenna port for a second signal, and the mapping of the antenna port to the logical antenna port includes:
mapping the first antenna port to a first logical antenna port among the logical antenna ports through the first virtualization; and
mapping the second antenna port to a second logical antenna port that is different from the first logical antenna port among the logical antenna ports through the first virtualization.

11. An antenna virtualization apparatus comprising:
a first complex linear input/output conversion device mapping an antenna port to a logical antenna port through a first virtualization;
a second complex linear input/output conversion device mapping the logical antenna port to a transceiver unit (TXRU) through a first operation;
a third complex linear input/output conversion device mapping the TXRU to a logical TXRU through a second operation; and
a fourth complex linear input/output conversion device mapping the logical TXRU to a physical antenna element through a second virtualization,
wherein a first complex matrix corresponding to the first operation is a unitary matrix of which a size of each element is 1 and is an inverse matrix of a second complex matrix corresponding to the second operation.

12. The antenna virtualization apparatus of claim 11, wherein:
the first complex matrix is generated based on one of a discrete Fourier transform (DFT) matrix and an inverse discrete Fourier transform (IDFT) matrix; and
the second complex matrix is generated based on the other of the DFT matrix and the IDFT matrix.

13. The antenna virtualization apparatus of claim 11, wherein:
the first complex matrix is generated based on one of a Hadamard matrix and an inverse matrix of the Hadamard matrix; and
the second complex matrix is generated based on the other of the Hadamard matrix and the inverse matrix of the Hadamard matrix.

14. The antenna virtualization apparatus of claim 12, wherein
the DFT matrix is defined by Equation 1 below,
the first complex matrix has rows of the same number as the number of the TXRUs and columns of the same number as the number of the logical antenna ports, and
the second complex matrix has rows of the same number as the number of the logical TXRUs and columns of the same number as the number of the TXRUs:

$$F = \frac{1}{\sqrt{M}} \begin{bmatrix} 1 & 1 & \cdots & 1 \\ 1 & w & \cdots & w^{M-1} \\ \vdots & \vdots & \ddots & w^{2(M-1)} \\ 1 & w^{M-1} & \cdots & w^{(M-1)(M-1)} \end{bmatrix}, \quad [\text{Equation 1}]$$

where $w = e^{-\frac{2\pi i}{M}}$ and $i = \sqrt{-1}$ $$\begin{pmatrix} F: \text{the } DFT \text{ matrix,} \\ M: \text{the number of the } TXRUs \end{pmatrix}.$$

15. The antenna virtualization apparatus of claim 13, wherein:
the Hadamard matrix is defined by Equation 1 below:

$$H_1 = [1],$$
$$H_2 = \begin{bmatrix} 1 & 1 \\ 1 & -1 \end{bmatrix},$$
$$H_M = \begin{bmatrix} H_{2^{k-1}} & H_{2^{k-1}} \\ H_{2^{k-1}} & -H_{2^{k-1}} \end{bmatrix} = H_2 \otimes H_{2^{k-1}} \text{ for } 2 \leq k \in M$$
$$\begin{pmatrix} H_M: \text{ the Hadamard matrix,} \\ M: \text{ the number of the } TXRUs, \\ \otimes: \text{ Kronecker product of a matrix} \end{pmatrix}.$$

[Equation 1]

16. The antenna virtualization apparatus of claim 11, wherein
the first complex linear input/output conversion device maps a first antenna port for a first signal among the antenna ports to a first logical antenna port among the logical antenna ports through the first virtualization, and maps a second antenna port for a second signal among the antenna ports to the first logical antenna port through the first virtualization.

17. The antenna virtualization apparatus of claim 11, wherein
the first complex linear input/output conversion device maps a first antenna port for a first signal among the antenna ports to a first logical antenna port among the logical antenna ports through the first virtualization, and maps a second antenna port for a second signal among the antenna ports to a second logical antenna port that is different from the first logical antenna port among the logical antenna ports through the first virtualization.

18. A signal transmission method of a transmitter, comprising:
grouping a plurality of antenna ports into a plurality of port groups;
mapping an antenna port of at least one first port group among the plurality of port groups to a logical antenna port through a first virtualization;
mapping the logical antenna port to a transceiver unit (TXRU) through a first operation;
mapping the TXRU to a logical TXRU through a second operation; and
mapping the logical TXRU to a physical antenna element through a second virtualization,
wherein a first complex matrix corresponding to the first operation is a unitary matrix of which a size of each element is 1 and is an inverse matrix of a second complex matrix corresponding to the second operation.

19. The signal transmission method of claim 18, wherein the grouping includes
including an antenna port, belonging to a first row and having first polarization among the plurality of antenna ports arrayed multi-dimensionally, in the at least one first port group.

20. The signal transmission method of claim 18, wherein the grouping includes
including an antenna port belonging to a first row among the plurality of antenna ports arrayed multi-dimensionally in the at least one first port group.

* * * * *